United States Patent [19]
Chenut

[11] 3,724,570
[45] Apr. 3, 1973

[54] POSTAL METER WITH LETTER WEIGHT CHECKING DEVICE

[76] Inventor: Gabriel Chenut, 68 rue Bourdignon, Saint Maur, France

[22] Filed: June 5, 1972

[21] Appl. No.: 259,673

[30] Foreign Application Priority Data

June 7, 1971 France..................7120455

[52] U.S. Cl. ...............177/4, 177/50, 209/121
[51] Int. Cl. .....................G01g 23/38, G01g 19/52
[58] Field of Search ..........177/4, 48, 50, 1; 209/121; 235/101

[56] References Cited
UNITED STATES PATENTS

| | | | |
|---|---|---|---|
| R25,998 | 3/1966 | Silverschotz | 209/111.8 |
| 3,057,547 | 10/1962 | Adler et al. | 235/101 X |
| 3,220,547 | 11/1965 | Krupotich | 209/121 X |
| 3,220,550 | 11/1965 | Gilbert | 177/50 X |
| 3,290,491 | 12/1966 | Wahlberg | 209/121 X |
| 3,648,839 | 3/1972 | Bradshaw et al. | 177/1 X |

Primary Examiner—George H. Miller, Jr.
Attorney—Munson H. Lane et al.

[57] ABSTRACT

Postal meter comprising a pre-set weigher and a pre-set postage printer and an alarm means to prevent printing if a letter weighs more than the pre-set weight.

6 Claims, 3 Drawing Figures

PATENTED APR 3 1973 3,724,570

POSTAL METER WITH LETTER WEIGHT CHECKING DEVICE

FIELD OF THE INVENTION

The present invention relates in general to postal meters of the type comprising a printing device for stamping the letters and support means on which each letter to be stamped remains stationary, at least during a short time period, before being stamped by the printing device with an amount or postal tax corresponding to a predetermined weight.

BACKGROUND OF THE INVENTION

The use of these postal meters is becoming increasingly popular for franking commercial letters and mail in general, due to the great acceleration thus brought to this operation. However, this fast rate of operation and the necessity of setting the value of the stamped tax according to the weight of each letter constitutes a source of errors. Even in the simplest case of ordinary letters to be franked at the current postal rates it is a frequent occurrence that in a series of letters some of them weighing more than the first maximum permissible weight (for example 20 grams) escape the operator's attention and are therefore not stamped with a sufficient amount, with the dual inconvenience of retarding the mail routing and compelling the recipient to pay a tax, which is particularly detrimental in commercial or business mail.

SUMMARY OF THE INVENTION

It is the essential object of the present invention to avoid this inconvenience by providing a postal meter of the type broadly set forth hereinabove but equipped with means for signalling to the operator that the amount about to be stamped on the latter must be modified if said amount is not sufficient for the weight thus checked.

To this end, the postal meter according to this invention is characterized in that it comprises, in addition, a weighing device comprising support means on which each letter remains momentarily stationary in order to weigh each letter before it is actually franked, this weighing device being operatively associated with means for preventing the operation of the franking device in case the letter weighed by the weighing device exceeds the preset weight.

Preferably, the weighing device is also operatively associated with means capable of releasing an alarm signal if the letter which, at a given time, is carried by said support means, weighs more than the predetermined weight.

The weighing device may be of any desired type such as mechanical, electrical, magnetic or else, and the release means as well as the means for preventing the operation of the printing device may also be of any suitable type consistent with the weighing device employed; thus, for example, these means may be of purely mechanical, or electromechanical, electronic, photoelectric, photoelectronic character, etc.

BRIEF DESCRIPTION OF THE DRAWING

Now a detailed description of this invention will be given by way of example with reference to the accompanying drawing, in which.

DESCRIPTION OF THE PREFERRED EMBODIMENT

Figure 1:
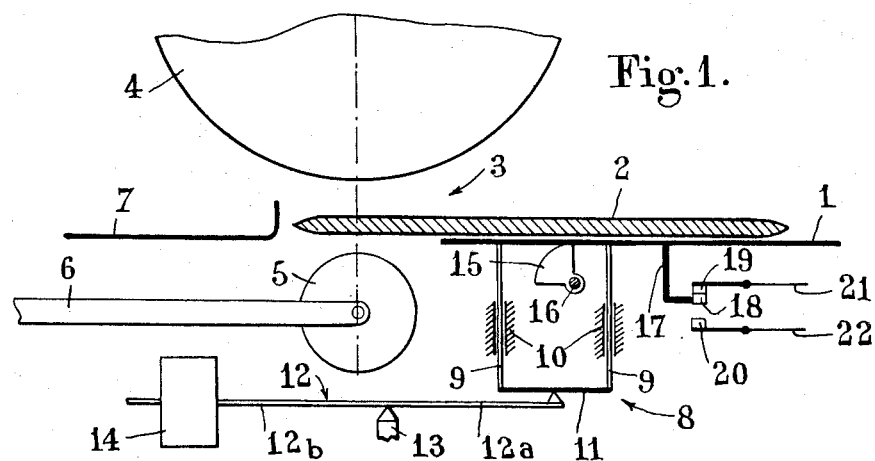
FIG. 1 is a diagrammatic view of an electric, non-automatic postal meter of known type, to which the present invention is applied, this figure showing only the elements of the machine which are definitely necessary for a proper understanding of the invention.

The postal meter illustrated in the drawing comprises essentially a plate 1 adapted to carry a letter 2 in a printing area 3 of a printing device adapted to frank the letter for a predetermined amount.

This printing device may consist, as shown, of a printing roller 4 and an impression roller 5 normally urged away from each other and adapted, when the operator depresses a printing control key (not shown) for energizing the printing control circuit (also not shown), are moved towards each other in order to print the stamp value on the letter 2. In the example illustrated the roller 5 is rotatably mounted on a pivoting arm 6 so that it can be pressed against the companion roller 4 with the interposition, of course, of said letter 2. During the printing operation, at least one of said rollers 4, 5 being rotatably driven, the letter 2 is transferred to a receiving member 7 (shown only partially in the drawing) consisting for example of an inclined chute, tray or guide member leading to a collecting basket or container. All these elements as well as their relative arrangement and their mode of operation are well known in the art and therefore it is not deemed necessary to describe them in detail. On the other hand, it is clear that the present invention is not limited by the specific printing device described and illustrated herein, since any other suitable electrical or manual printing system may be substituted therefor, if desired, without departing from the scope of the invention.

With the above-described postal meter, if the operator inadvertendly puts a letter weighing more than the predetermined limit (for example 20 g) on the carrier plate 1, it is clear that no means are provided for signalling this error and therefore the machine will frank the letter for an insufficient amount if the machine is set for franking letters having a maximum weight of 20 g.

According to this invention and in order to avoid this inconvenience, there is provided a weighing device 8 checking the weight of the letter 2 while the latter is stationary on the plate 1 in the printing area 3, before it is actually franked by the printing device 4, 5. This weighing device is operatively connected to means adapted to release an alarm signal and preferably also to means for preventing the printing device from operating in case the weight of the letter 2 exceeds a predetermined limit value.

In the form of embodiment illustrated by way of example in the drawing, the plate 1, instead of being stationary, may be vertically movable and constitute the tray of a beam scale. This is shown very diagrammatically by the fact that the plate 1 is supported by a pair of vertical rods 9 adapted to slide in guide members 10 carried by the frame structure of the postal meter and interconnected at their lower ends by a cross member 11 bearing on the end of one arm 12a of a two-armed lever 12 carrying on its other arm 12b a counterweight 14.

Figure 2:
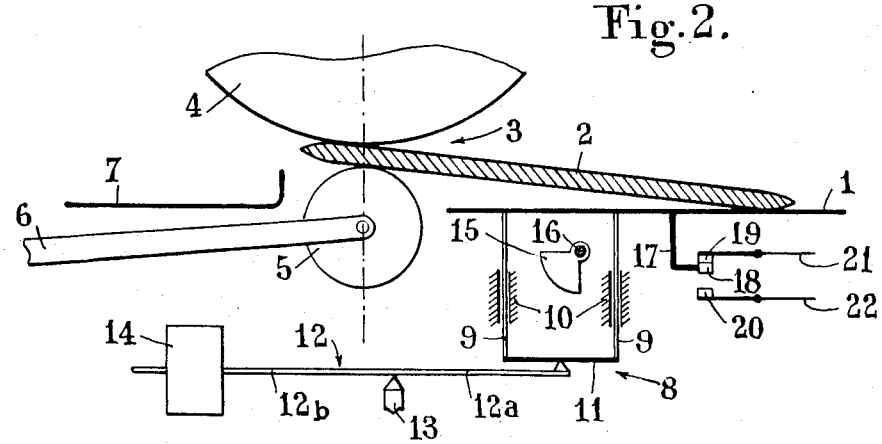
FIGS. 2 and 3 are diagrammatic views similar to FIG. 1 showing the positions of the component elements of the machine after placing a letter on the receiving plate and after the operator has depressed a printing control knob, the weight of this letter being lower (FIG. 2) and higher (FIG. 3) respectively than a predetermined weight setting.
Figure 3:
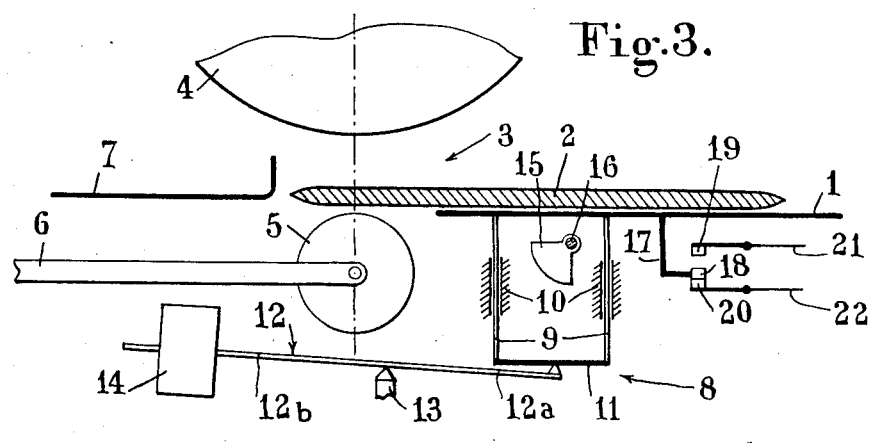

A cam 15 retractable by pivoting about a pin 16 normally retains in the inoperative condition of the device the tray 1 in its upper position (FIG. 1) and is adapted when retracted to release this tray (FIGS. 2 and 3) when the operator controls the franking by impression or printing, after having deposited a letter on said tray 1, by depressing for example a printing control key (not shown).

The cam 15 is retractable in various manners, for example in a purely mechanical manner or electromagnetically. In any case the cam 15 must be retracted some time before the actual operation or energization of the printing device, in order to allow a sufficient time to elapse for enabling the weighing device to check the weight of the letter and, if necessary, deliver an alarm signal while preventing the operation of the printing device.

If a printing control key is provided in the machine, this requirement can easily be met by causing this key, when depressed, to control during the first section of its downward stroke the retraction of cam 15 and, at the end of this stroke, the printing operation proper if the weight of the letter checked by the weighing device does not exceed the predetermined or limit weight.

If the machine comprises an electrical printing control circuit, the above-mentioned release means may consist of a normally open or front contact inserted in an alarm circuit, and the means for preventing the operation of said printing device may consist of a normally closed or back contact inserted in the printing control circuit. These contacts may be of any suitable electrical, electromechanical, electromagnetic, electronic or other type, and may be controlled by the weighing device in any suitable manner, for example through mechanical, electromagnetic or photoelectric means.

In the specific form of embodiment illustrated there is secured under the plate or tray 1 (or to any other movable member of the weighing device) one end of a bent arm 17 having its other end provided with a movable contact stud 18 adapted, when the plate 1 is in its upper position (FIGS. 1 and 2) to engage a first fixed contact stud 19 and, when the plate 1 is in its lower position (FIG. 3) to engage another fixed contact stud 20. The first fixed contact stud 19 is connected via a conductor 21 to a circuit (not shown) adapted to activate the printing control circuit.

Contact studs 18 and 20 constitute the above-mentioned front contact and contacts 18 and 19 constitute the above-mentioned back contact. In the example illustrated the movable contact stud 18 is common to the circuit controlling the printing device and the alarm device, and is for example electrically connected to a current source (not shown) common to both circuits. However, it may happen, in certain cases, that the printing control circuiy and the alarm control circuit should constitute definitely separate circuit sections; in this case the movable contact stud 18 may be divided into two sections electrically insulated from, and overlying, each other, each contact section being connected to a corresponding portion of the two separate circuits.

In a particularly simple form of embodiment of this invention, designed to cause the closing of contacts 18, 20 to generate directly an alarm signal, for example a light signal, said contacts 18, 20 may be connected in series in the circuit supplying energizing current to a signal lamp in order to light up same when they engage each other.

Thus, with the above-described machine, when the operator having disposed a letter 2 on the tray 1 depresses a printing control key, the cam 15 is retracted and then two cases may arise. Either the weight of this letter 2 is inferior to the predetermined maximum value (depending on the mass of the counterweight 14 and/or of its position along the lever arm 12b, and in this case the tray 1 remains in its upper position, so that contact studs 18, 19 remain in mutual contact, the printing control circuit is not open and the franking operation may take place normally, or the weight of the letter 2 exceeds said predetermined limit (for example 20 g) so that the tray 1 is lowered thus opening the contacts 18 and 19 while closing contacts 18 and 20. As a result, the printing operation is prevented from taking place and a light signal is emitted, thus warning the operator that the amount of the postage tax to be printed on this letter 2 must be modified. In most known postal meters the printing device of the machine is adjustable so that the amount to be printed can be modified as required. Under these conditions and according to a complementary feature of this invention, it is possible to slidably mount the counterweight 14 on the lever arm 12b so that it can be brought to the various positions corresponding to the different weight values requiring the payment of different postage taxes. In the simplest example manual control members may be provided for shifting the counterweight 14, with suitable reference marks corresponding to the different weight ranges. With this arrangement, if the counterweight 14 is set to a position corresponding to a first predetermined permissible maximum weight, for example 20 g, if the printing device is set for printing a postage tax corresponding to letters weighing less than this first predetermined weight, and if the weight of the letter 2 placed on the tray 1 exceeds this first predetermined weight, the printing cannot take place and the light signal is energized as described hereinabove. Under these conditions, the operator may shift the counterweight 14 to a second position corresponding to a second predetermined permissible maximum weight, for example 50 g, and also set the printing device in a manner known per se so that it will be ready to print a postage tax corresponding to this second weight range. If, notwithstanding these adjustments, the weight of the letter 2 is still heavier than this second predetermined weight, the tray 1 will be lowered, thus preventing the printing operation from being performed by the device while causing again the energization of the light signal. Thus, by effecting successive shiftings of the position of the counterweight 14 and changing the postage tax to be printed by the device, the operator will eventually find the weight range corresponding to the letter 2, i.e., below a given or predetermined maximum weight value, and the stamping can take place normally.

With the weight checking device described hereinabove each time the operator controls a printing operation the cam 15 is retracted to enable the weighing device to check the actual weight of the letter and if necessary cause at least an alarm signal to operate in case this weight were higher than a predetermined limit. However, to permit the franking of certain letters outside the current weight ranges for which the weight checking device is preset, notably in the case of airmail letters, it is desirable to have the possibility of neutralizing the weight control device. In the example illustrated, this requirement may be met very easily by providing locking means (not shown) adapted to lock the plate 1 in its upper position, for example by acting directly thereon or preventing the retraction of cam 15.

Of course, the form of embodiment described hereinabove with reference to the attached drawing is given by way of illustration, not of limitation, and many modifications and variations may be brought thereto without departing from the basic principle of the invention. Thus, notably, the closing of contacts 18 and 20 may be utilized for actuating an adjustment device capable of automatically adjusting the position of counterweight 14 along the arm 12b and at the same time adjusting the amount of the postage tax to be printed by the printing device. On the other hand, the franking value may be adjusted automatically by comparing the actual weight of the letter with information previously recorded by the machine, for example by utilizing piezoelectric pulses and a memory in the form of an interchangeable card comprising a magnetic tape. Moreover, instead of a mechanical device, an electrical weighing device may be used for converting the weight of the latter into an electric signal the amplitude of which is subordinate to the weight of this letter, at least one threshold circuit being provided in this case for determining whether the weight of the letter to be franked is below or above a predetermined weight corresponding to a predetermined amplitude of said electric signal, in order to open the control circuit of the printing device while closing the alarm circuit and/or a circuit for adjusting the postage value to be printed. Thus, on the other hand, the postal meter to which the present invention is applied would be operated simply manually. In this case, it is only necessary that the downward movement of tray 1, when the letter exceeds a predetermined maximum weight, causes the printing device to be located and a visual signal to be displayed. Furthermore, instead of being incorporated permanently to the postal meter, the weighing device, the means for releasing an alarm signal and the means for preventing the operation of the printing device could constitute, or be assembled in, a separate or detachable unit adapted to be associated with the postal meter and designed for presenting the letter to this machine. In this case, the roller 4 would act only as a driving or feed cylinder, and the postage tax amount would be printed in the area 7. For example, if the operation of the printing device were controlled by a microswitch (actuated by mechanical, photoelectric or other means) responsive in turn to the forward movement of the letter to be franked, the means for preventing the operation of the printing device may consist of a simple member adapted to prevent this letter from continuing its forward travel and actuating the aforesaid microswitch.

What I claim is:

1. Postal meter comprising a device for printing the postage on letters and support means on which each letter is held stationary during a short time before being introduced into the device for printing, said device for printing being set to a predetermined amount corresponding to a predetermined weight, said support means comprising a weighing device, means responsive to the weighing device which permits printing if the weight of the letter is less than or equal to the predetermined weight and prevents printing if the weight is more than the predetermined weight.

2. Postal meter as set forth in claim 1, wherein said printing device is adapted to be adjusted for modifying the postage tax to be printed, and said weighing device comprises an adjustable counterweight adapted to be brought selectively to different positions corresponding to various ranges of weights requiring different franking amounts.

3. Postal meter as set forth in claim 1, wherein said weighing device is also associated with means capable of releasing an alarm signal when the letter which, at a given time, lies on said support means weighs more than said predetermined weight.

4. Postal meter as set forth in claim 3, comprising an electric circuit controlling said printing device, and wherein said release means comprise a first front contact responsive to said weighing device and inserted in an electric alarm circuit, and said means for preventing the operation of said printing device comprise a back contact responsive to said weighing device and inserted in the printing control circuit, said front contact and back contact being closed and open, respectively, when the weight of the letter exceeds the predetermined weight so as to actuate an alarm device inserted in said alarm circuit, and cut out the control circuit and thus prevent the operation of said printing device.

5. Postal meter as set forth in claim 1, wherein a plate adapted to carry a letter in the printing area of the printing device is provided and wherein said plate is vertically movable and constitutes the plate of a beam scale.

6. Postal meter as set forth in claim 5, wherein a retractable cam adapted normally to hold the plate in its upper position is provided and adapted to be retracted for releasing the plate when an operator controls the printing of a postage tax after having placed a letter on said plate.

* * * * *